Aug. 22, 1939.   I. E. McELROY ET AL   2,170,786
HYDRAULIC TRANSMISSION APPARATUS
Filed Oct. 27, 1937   3 Sheets-Sheet 1

INVENTORS.
ISAAC E. McELROY
RICHARD H. SHADRICK
BY
Andrew E. Carlsen
ATTORNEY.

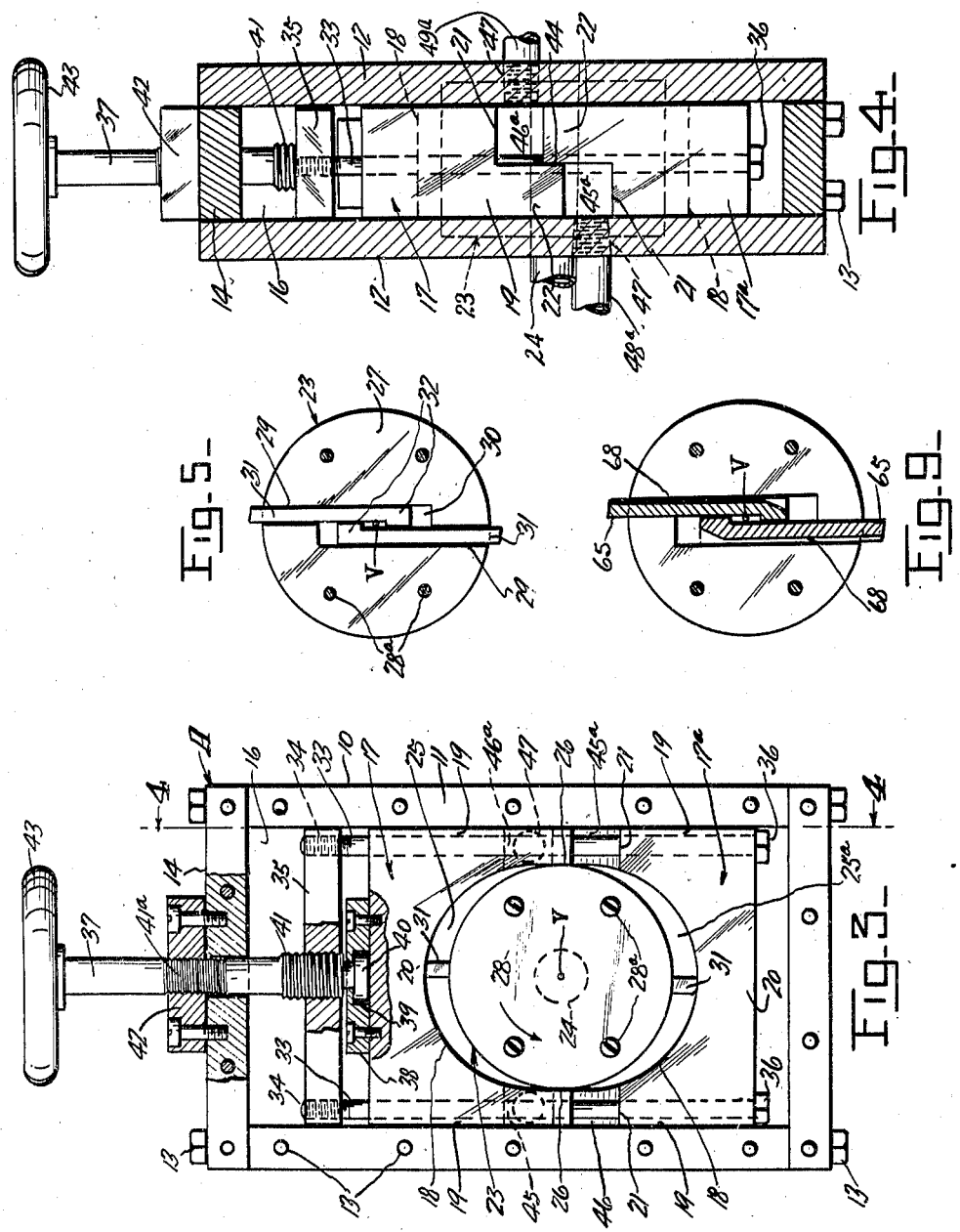

Aug. 22, 1939.　　I. E. McELROY ET AL　　2,170,786
HYDRAULIC TRANSMISSION APPARATUS
Filed Oct. 27, 1937　　3 Sheets-Sheet 3
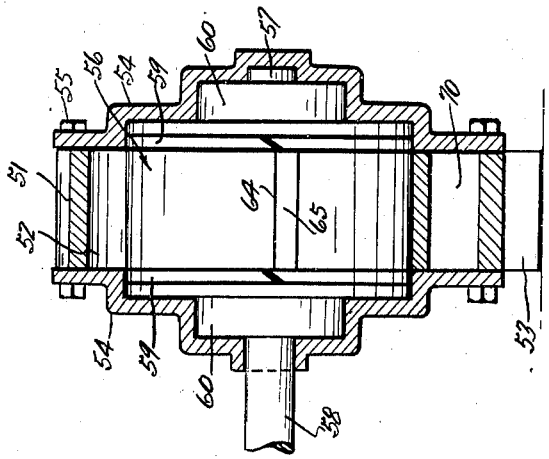
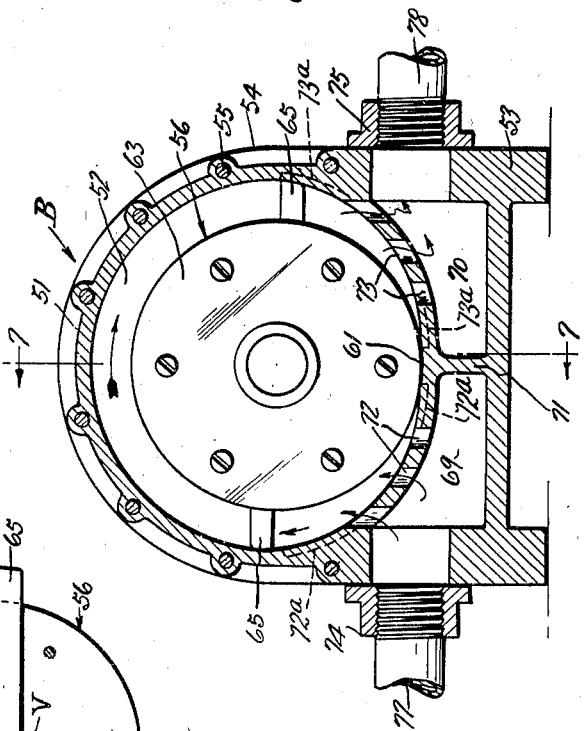
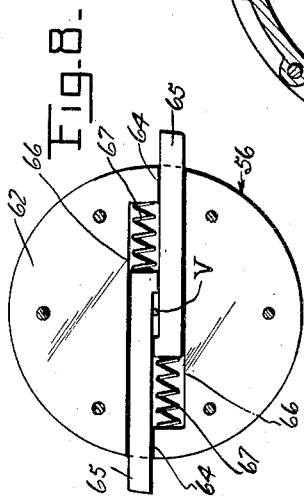
INVENTORS.
ISAAC E. McELROY
RICHARD H. SHADRICK
BY
ATTORNEY.

Patented Aug. 22, 1939

2,170,786

UNITED STATES PATENT OFFICE 2,170,786

HYDRAULIC TRANSMISSION APPARATUS

Isaac E. McElroy and Richard H. Shadrick, Minneapolis, Minn.

Application October 27, 1937, Serial No. 171,261

5 Claims. (Cl. 103—120)

This invention relates to hydraulic drive mechanisms and transmissions, and the primary object of the invention is to provide a mechanism of simple and efficient form which includes a driving unit energized by a prime mover to set up a hydraulic flow to a driven unit and to afford a continuously variable speed ratio of transmission to the driven unit.

Another and important object is to provide in a mechanism of this kind, a novel and advantageous form of driving unit in the form of a rotary pump having a balanced rotor arranged to give two equal impulses each rotation and including a chamber for said rotor with means for stepless variations of its volume whereby an even and continuously variable flow of power may be had from the pump. Another object is to provide a novel and efficient form of driven unit for a mechanism of this kind, and which is designed to operate effectively under influence of a relatively great volume of liquid at a relatively low pressure. This feature greatly reduces the cost of fabrication and upkeep of the unit, in that no elaborate sealing means or great nicety of fitting is required in order to hold the liquid under low pressure. Still another object is to provide a mechanism of this kind in an extremely simple, inexpensive form, suitable for a great number of applications where the cost of present high pressure systems prohibits their use and which may be readily set up to actuate the driven unit (or several units) at any remote point. These and other and more specific objects of the invention will become apparent in the course of the following specification, reference being had to the accompanying drawings, wherein:

Fig. 3 is an enlarged side elevation of the driving unit or pump alone, one face plate of the unit being removed to disclose the interior construction and certain of the parts being cut away and shown in section.

Fig. 4 is a cross section along the line 4—4 in Fig. 3.

Fig. 5 is an elevation of the pump rotor alone, and with its face plate removed to show the arrangement of the vanes.

Fig. 6 is a diametrical cross section, in an enlarged scale, of the driven unit or flow motor alone.

Fig. 7 is a cross section along the line 7—7 in Fig. 6, the rotor and associated parts being shown in elevation.

Fig. 8 is a view similar to Fig. 5, showing the flow motor rotor alone.

Fig. 9 is a similar view showing the vanes grounded out for actuation by the pressure around the rotor.

Figure 1:
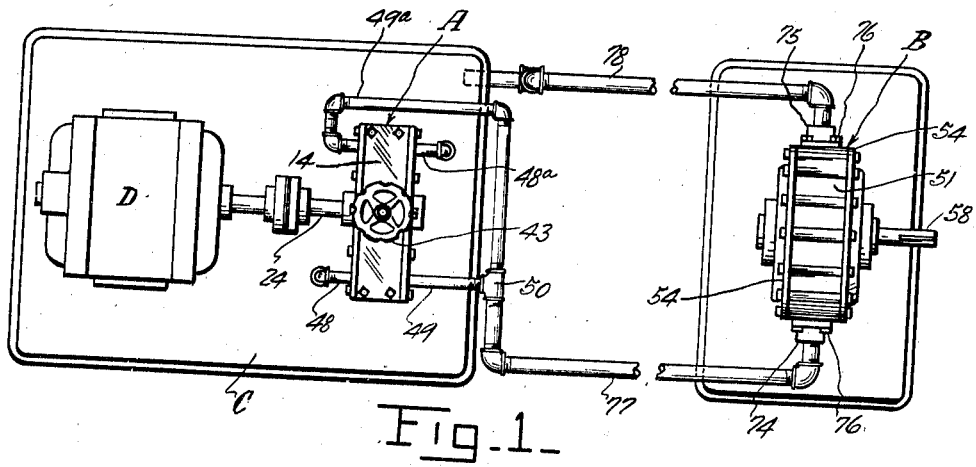
Fig. 1 is a plan view of the prime mover, driving and driven units as set up in one practical assembly and arrangement.

Referring now with more particularity to the drawings, it is shown that our invention includes two main complementary units or parts, one being the driving unit or pump A and the other the driven unit or flow motor B. The pump A as herein embodied, comprises a housing or casing 10 of rectangular shape made up of a surrounding frame 11 covered by rectangular face plates 12, the whole assembly being secured together by screws and bolts, indicated at 13. For convenience in description one end, as 14, of the housing 10 is called the upper end, and the housing is shown as mounted in upright position, with this end uppermost, on a base C, the mounting being by the feet or angles 15.

Mounted in the rectangular chamber 16 formed in the housing 10 is a pair of adjustable blocks, headers, or members shown at 17—17a. These members are of such thickness that they will fit oil tight but in a slidable manner in the housing 10. Each member has an arcuate or semi-circular recess 18 cut in one face having relatively narrow extended, parallel sides 19 and the back or reach 20. The extremities of these sides 19 are notched out just one half their thickness and on opposite sides, as indicated at 21, thus leaving fingers 22 which are arranged in overlapping relation as shown. The members 17—17a are thus so mounted that they may slide together or apart within the housing 10 and, the recesses 18 being cut in adjacent faces, the members will in their inward or collapsed position enclose and define a circular chamber in the housing and then by drawing the members apart this recess will be elongated vertically into an oval shape as will be apparent.

A rotor 23 is journaled in the housing 10 centrally between the members 17—17a, and includes an extended drive shaft 24 journaled through one side 12 of the housing. This rotor has the same radius as the recesses 18, and when the members 17—17a are drawn together the rotor will occupy the entire space within the recesses. However, when the members 17—17a are then pulled apart, there will be formed two identical crescent-shaped chambers 25—25a above and below the rotor and which chambers are sealed from each other by the inner margins of the fingers 22 which remain constantly in contact with the periphery of the rotor at the diametrically opposite points 26.

The rotor 23 comprises a main disk or member 27 and a cover plate 28 mounted by screws 28a, and this disk 27 has diametrically extended slots 29 enlarged at their central portions as shown at 30. The slots 29 are offset laterally as shown, and slidably receive the vanes 31 which have the widened overlapping heads 32 at their inner extremities to prevent them from pulling entirely apart and becoming disengaged from the rotor. Of course when the plate 28 is in place these vanes 31 are retained in the rotor. The outer extremities of the vanes 31 are adapted to ride the inner peripheral faces of the recesses 18 when the rotor is rotated, and the vanes are normally urged outwardly for this purpose by centrifugal force. The sides of the rotor 23 are recessed into the inner faces of the plates 12 as shown in dotted lines in Fig. 4.

For this rotation of the rotor 23 an electric motor D or other form of prime mover may be employed and connected, as shown at the shaft 24.

Attention is now directed to the means for moving the members 17—17a together and apart, as described. A long bolt or pin 33 is extended through the sides 19 of each member 17—17a clear of the recesses 18, and these pins are threaded at their upper ends 34 in a yoke 35 which extends crosswise above the upper member 17. Heads 36 are provided on the lower ends of the bolts 33 below the lower member 17a. A screw 37 is rotatably anchored at its lower end to the upper member 17 by means of the cap 38 which is secured to the member and has a circular undercut recess 39 receiving the peripherally grooved end 40 of the screw. In this screw 37 are two threaded portions 41—41a, and the lower portion 41 is threaded through the center of the yoke 35 while the upper portion 41a passes loosely through the housing end 14 and is threaded in a block 42 secured atop this end. A hand wheel 43 is secured to the top of the screw 37. The threads in each portion 41—41a are cut in the same direction, but the upper threads are just twice the pitch of the lower threads. Thus there is a differential as between the upward or downward movement of the screw 37 (when the hand wheel 43 is turned), and the upward and downward displacement of the yoke 35 along the screw such as will cause the movement of the screw to impart an equal but opposite motion to both of the members 17—17a causing them to move together or apart at the same relative rate. It will thus be understood that by turning this hand wheel 43 the volume of the chambers 25—25a above and below the rotor 23 may be varied in smooth and stepless fashion from zero to the maximum afforded by the length of the fingers 22.

Figure 2:
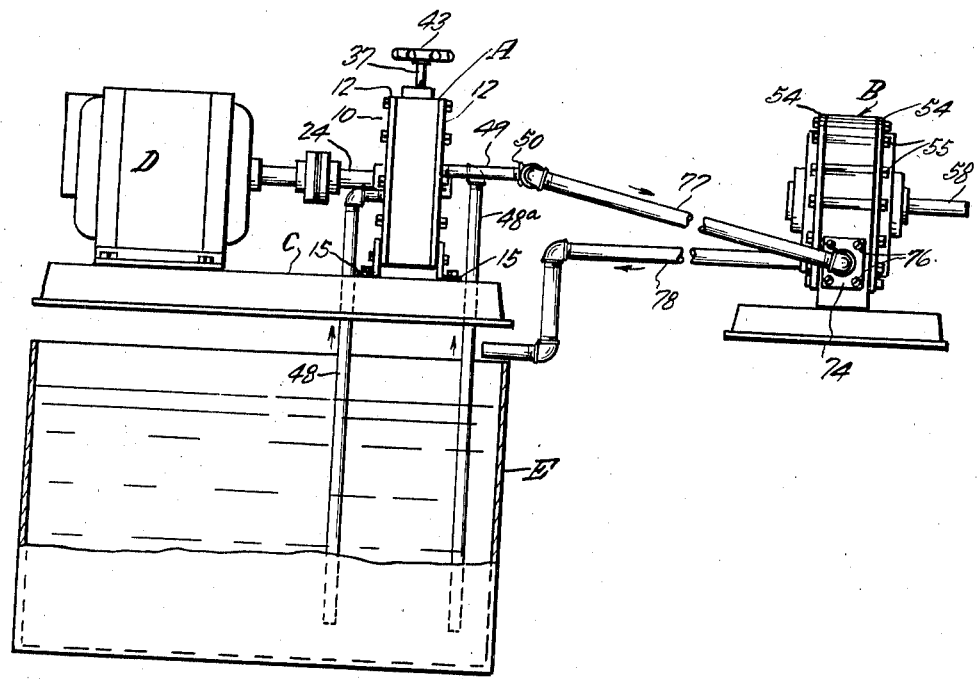
Fig. 2 is a side view of this assembly, also showing the supply tank for the liquid used in the system.

It will be noted that as the members 17—17a are moved apart, openings or gaps are formed between the ends of the fingers 22 and the notches 21, and there will be two of these openings formed at each side of the rotor with each pair of adjacent openings sealed and isolated from each other by the intervening contacting faces 44 (Fig. 4). These openings are used as the inlets and outlets for the unit, there being an inlet 45—45a and an outlet 46—46a on each side of the rotor in the manner and arrangement shown. The side plates 12 of the housing 10 have tapped openings 47 registering with these various inlets and outlets, and a pair of inlet pipes or lines 48—48a and a pair of outlet pipes or lines 49—49a are screwed in these openings, as indicated particularly in Figs. 1 and 2. The inlet pipes 48—48a are led into a supply tank or container E wherein is maintained a supply of the oil or other liquid used in the system. The outlet pipes 49—49a are led out and joined at a T-coupling 50.

It will now be evident that with the motor D operating and the members 17—17a moved apart, the oil will be drawn in by the pipes 48—48a and carried around the rotor 23 by the vanes 31 and discharged under pressure through the pipes 49—49a. The amount or volume of the oil handled and discharged will be directly dependent on the volume of the chambers 25—25a, and may be varied smoothly by adjustment of the hand wheel 13. The movement of the oil will be apparent from the drawings, and will also be evident that there will be two impulses exerted on the oil flow each revolution of the rotor.

The driven unit of flow motor B comprises a housing 51 having the hearth-shaped chamber 52 and the base 53. The chamber 52 is enclosed by the side plates or bells 54 mounted and sealed by bolts 55, and a rotor 56 of circular form is journaled in the chamber 52 by means of the end stub 57 and driven shaft 58 journaled in and through the side bells 54. These bells 54 are cupped out centrally to receive the sealing rings 59, each side of the rotor 56 and also the ball bearings 60.

The minor radius of the chamber 52 is on the lower side, and the rotor 56 is so mounted that it will fit oil tight against the lower center portion of the chamber, as indicated at 61, it being understood of course that the rotor also is oil tight at its sides. This rotor 56, like the aforesaid rotor 23, comprises a disk or body portion 62 covered by a removable plate 63, and the said disk has the diametrically extended slots 64 in which the vanes 65 are slidably mounted and retained by the plate 63. The inner portions 66 of the slots 64 are widened to receive the heads of the vanes, as shown.

It may here be noted that the vanes may also be spring set or pressure operated to move them outwardly from the rotor instead of depending on centrifugal force for this purpose as hereinbefore described. Thus, as shown in Fig. 8, the vanes may be backed up by expansion coil springs 67 located in the inner extremities of the vane slots so that the vanes are urged outwardly. Or as shown in Fig. 9, the vanes 65 may be grooved on one face, as indicated at 68, so that the oil (which is under pressure in the chamber 52 as will be described) will work in behind or inside the vanes and exert a constant yielding outward pressure on the vanes. Of course either of these methods may be used as well for actuating the vanes 31 of the pump rotor 23, and it is also noted at this point that any number (preferably an even number) of vanes may be used in either of the rotors. It may also be noted that the rotors, as shown in Figs. 5, 8, and 9 are, in each instance, provided with a vent V leading to a low pressure area, so as to prevent compression in the recess between the blade shoulders.

The base 53 of the driven unit B is cored out on opposite sides forming an inlet port 69 and an outlet port 70 isolated by a medial wall or web 71. The inlet and outlet ports are thus located just below the chamber 52 and communicate therewith on opposite sides of the sealing point 61 by means of the openings 72 and 73 in the adjacent wall of the chamber. Pipe couplings 74 and 75 are secured by screws 76 over the laterally opening mouths of the ports 69 and 70, and are tapped to receive an inlet pipe 77 and outlet or return pipe 78. The said inlet pipe 77 runs out to the aforesaid T-coupling 50 while the outlet pipe 78 is led to the supply tank E. Groove-like extensions 72a and 73a of the openings 72 and 73 prevent locking of the rotor 56 or trapping of oil in the chamber, as will be clearly evident.

In operation the oil under pressure from the driving unit B is led through the pipe 77 to the inlet port 69, where it enters the chamber 52 through the openings 72 and acts against the vanes 65 to rotate the rotor 56 in the direction indicated. The oil, after traveling around the rotor, is led out through the openings 73 and outlet port 70 to the pipe 78 and is thereby carried back to the tank E to maintain the level therein. It will be evident of course that the speed at which the rotor 56 is operated will depend upon the volume and pressure of oil discharged by the driving unit A, and thus by adjustment of the hand wheel 43 the final power output and speed at the driving shaft 58 may be controlled and varied in a smooth and stepless manner.

The driving and driven units may be arranged in any desired relative locations, whether close together or at remote points, and any reasonable number of driven units may be actuated by a single driving unit. The mechanism thus will have a multiplicity of uses, too numerous to enumerate herein.

Attention is directed to the fact that the balanced and "two impulse" operation of the driving unit is well adapted to handle a relatively great volume of liquid at a relatively low pressure, and for this reason no elaborate and expensive fitting and sealing of the various parts in either driving or driven unit is needed, thus effecting a very marked reduction in expense. This mechanism is therefore well adapted for many installations where the cost of the present high pressure systems prohibits their use.

It is understood that changes may be made in the structure as herein described, so long as such changes do not depart from the spirit or the scope of the appended claims. Having thus described our invention, what we claim as new and desire to protect by Letters Patent is:

1. In a hydraulic transmission device of the character described, a pump comprising a housing, a pair of block members slidably mounted in the housing and having opposed semicircular recesses, a rotor carrying radially slidable vanes journaled in the housing between the recesses in the said block members, means for moving the block members together or apart whereby separate chambers of variable volume are formed each side of the rotor, the said block members including side portions which remain at all times in contact with the rotor at diametrically opposite points to isolate the said chambers one from the other, and these side portions being notched out in opposite sides and arranged in overlapping relationship whereby inlet and outlet openings will be formed through these notches leading into the chambers when the block members are moved apart.

2. In a hydraulic transmission device of the character described, a pump comprising a housing, a pair of block members slidably mounted in the housing and having opposed semicircular recesses, a rotor carrying radially slidable vanes journaled in the housing between the recesses in the said block members, means for moving the block members together or apart whereby separate chambers of variable volume are formed each side of the rotor, the said block members including side portions which remain at all times in contact with the rotor at diametrically opposite points to isolate the said chambers one from the other, and these side portions being notched out in opposite sides and arranged in overlapping relationship whereby inlet and outlet openings will be formed through these notches leading into the chambers when the block members are moved apart, the said openings being isolated by contacting portions of the sides of the said block members.

3. In a hydraulic transmission device of the character described, a pump comprising a housing, a rotor journaled in the housing, the said rotor having radially slidable vanes, block members slidably mounted in the housing on opposite sides of the rotor, and having opposed semicircular recesses to receive the said rotor, the sides of the block members being extended alongside the rotor in contact therewith at diametrically opposite points, the said sides also having notches cut out on opposite sides forming fingers which slidably engage in overlapping relationship, a screw threaded through the housing and connected to one of the block members, a yoke connected to the other block member and threaded on the screw by threads of a different pitch than the threads through the housing whereby turning the said screw will move the block members together or apart forming separate chambers of variable volume on opposite sides of the rotor, and the said notches in the sides of the block members forming a pair of openings on each side of the rotor isolated by intervening contacting faces of the fingers, and these openings leading into the said chambers to serve as inlets and outlets therefor.

4. In a device of the character described, a housing, block elements slidably mounted in the housing and having recesses in their facing edges, a rotor journaled in the housing transversely with respect to the plane of movement of the block elements and located between the recessed edges thereof, vanes radially slidable in the rotor for movement through the chambers defined between the rotor and the recessed edges of the block elements, the said block elements having overlapping portions at each side of the recesses and bearing constantly on the rotor at diametrically opposite points, defining the extremities of the chambers, and the said overlapping portions having oppositely opening notches communicating with the opposite ends of the chambers for serving as inlets and outlets therefor.

5. In a device of the character described, a housing, block elements slidably mounted in the housing and having recesses in their facing edges, a rotor journaled in the housing transversely with respect to the plane of movement of the block elements and located between the recessed edges thereof, vanes radially slidable in the rotor for movement through the chambers defined between the rotor and the recessed edges of the block elements, the said block elements having overlapping portions at each side of the recesses and bearing constantly on the rotor at diametrically opposite points, defining the extremities of the chambers, the said overlapping portions having oppositely opening notches communicating with the opposite ends of the chambers for serving as inlets and outlets therefor, a differential screw having threaded portions of different pitch, the said screw being threaded by one of these portions into the housing and rotatably connected to one block element, a yoke threaded on the other threaded portion of the screw, and connecting members extended between this yoke and the other block element.

ISAAC E. McELROY.
RICHARD H. SHADRICK.